United States Patent [19]

Godbersen

[11] Patent Number: 5,076,603
[45] Date of Patent: Dec. 31, 1991

[54] BOAT TRAILER LOAD GUIDE UNIT

[76] Inventor: Byron L. Godbersen, Lake LaJune Estates, Ida Grove, Iowa 51445

[21] Appl. No.: 514,525

[22] Filed: Apr. 26, 1990

[51] Int. Cl.$^5$ .............................................. B60P 3/10
[52] U.S. Cl. .................................. 280/414.1; 414/529
[58] Field of Search ............... 280/414.1, 414.2, 414.3; 414/529–536

[56] References Cited

U.S. PATENT DOCUMENTS

| | | | |
|---|---|---|---|
| 3,993,324 | 11/1976 | Carrick | 280/414.1 |
| 4,033,600 | 7/1977 | Watson | 280/414.1 |
| 4,268,211 | 5/1981 | Schwebke | 280/414.1 |
| 4,620,716 | 11/1986 | Carbone | 280/414.1 |
| 4,715,768 | 12/1987 | Capps | 280/414.1 |
| 4,802,685 | 2/1989 | Godbersen | 280/414.1 |

FOREIGN PATENT DOCUMENTS 1001323 8/1965 United Kingdom ............. 280/414.2

Primary Examiner—Charles A. Marmor
Assistant Examiner—Mitchell Bompey
Attorney, Agent, or Firm—Henderson & Sturm

[57] ABSTRACT

A boat trailer having a frame with a tongue section at the front end and a pair of transversely spaced parallel frame members at the rear end, a wheel and axle unit interconnecting the frame members, and a crossmember extended between the frame members, the improvement comprising a bracket connected to each end of the crossmember and connected also to an adjacent frame member, an arm extended outwardly and upwardly of each frame member, a fastener securing one end of the arm to the bracket, and a bunk-type cushion secured to the other end of the arm for engaging a boat hull upon loading of the boat onto the trailer.

4 Claims, 2 Drawing Sheets

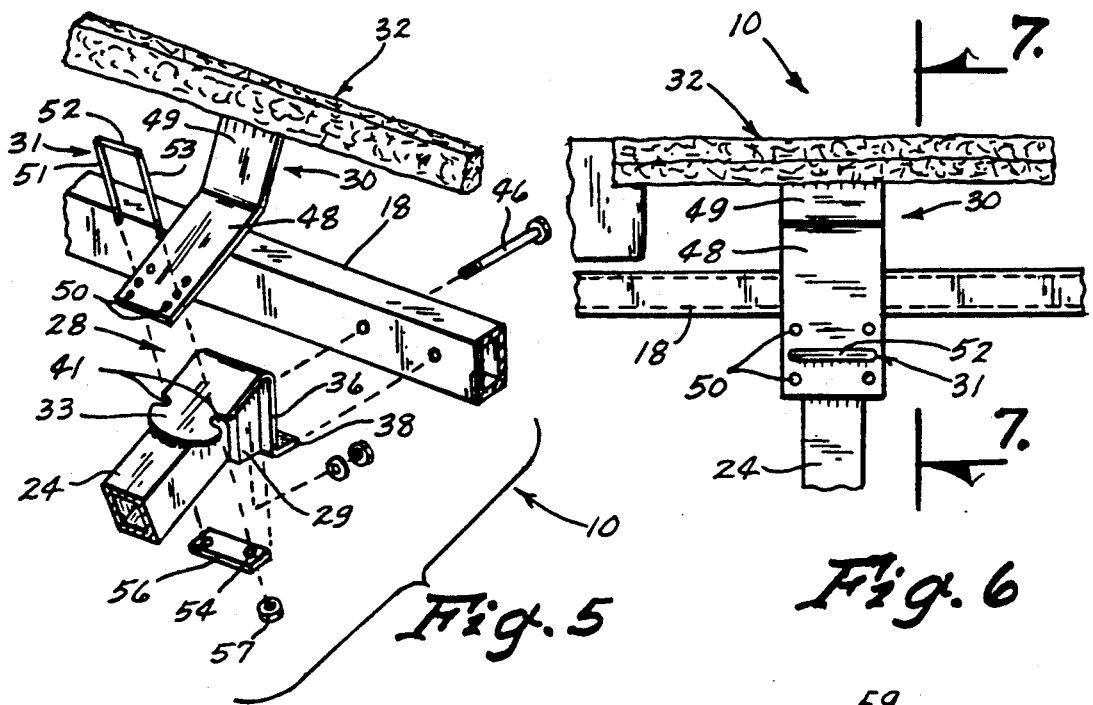
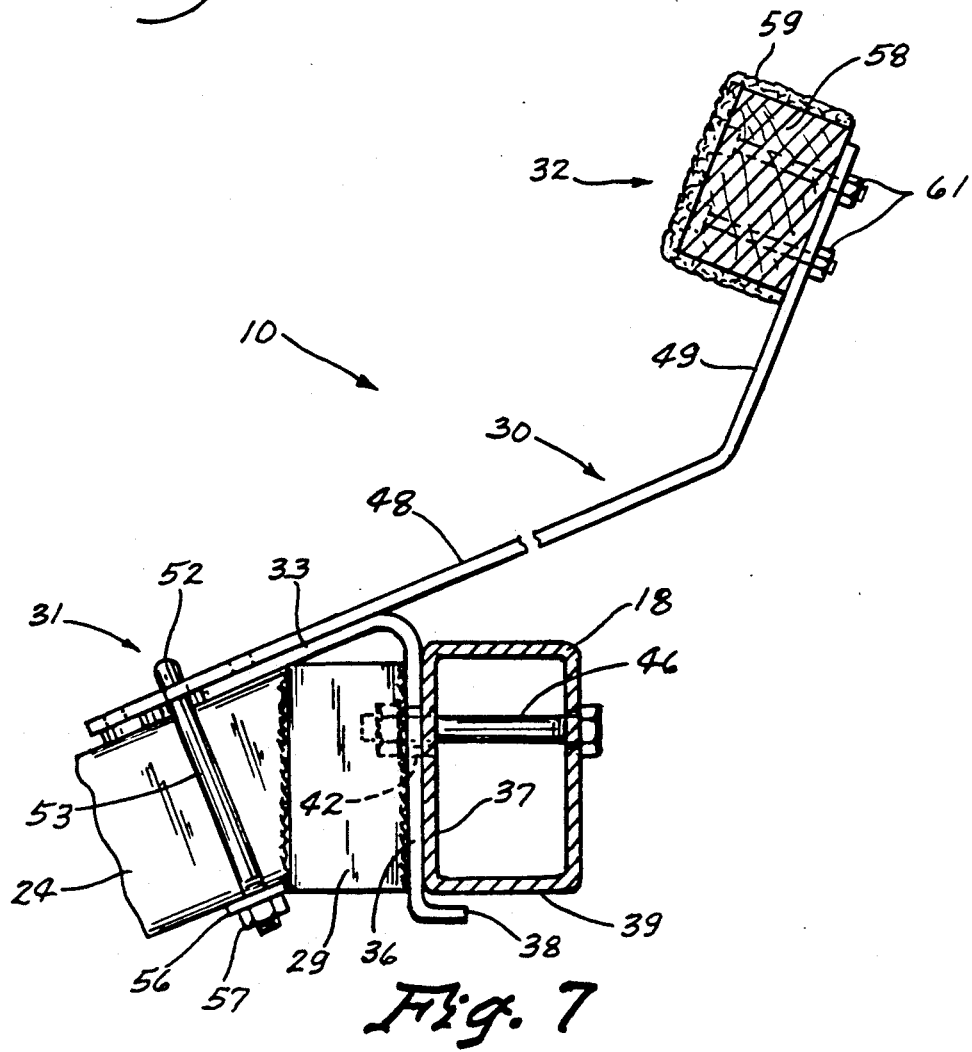

BOAT TRAILER LOAD GUIDE UNIT

TECHNICAL FIELD

The present invention relates to boat trailers in general, and in particular to a load guide structure attachable to one of the trailer crossmembers at each end thereof.

BACKGROUND ART

With an ever-increasing number of different sized, shaped and weighted boats, due to the increasing popularity of this industry, the provision of additional options for the effectiveness of the trailers, while making the options as universal as possible for use in conjunction with a great variety of trailers and boats is ever more important.

One such option as that which is commonly known as a load guide, a structure normally mounted on either side of a trailer frame for engaging a side portion of the hull of a boat upon loading and transporting of the boat. Of necessity, the load guide in its capacity of engaging and guiding the boat upon loading, and of providing certain resistance to lateral movement of the boat during transportation transmits that resistance to that to which it is secured, normally a side member of the frame. Such application of lateral torsional stresses to a frame side member may have innumerable disadvantages not only to the frame but also to other boat support assemblies of the trailer whose proper function depends upon a structurally sound and stable frame. It is to the elimination of such potential disadvantages that this invention is directed.

DISCLOSURE OF THE INVENTION

A boat trailer is provided having a fame with a tongue section at the front end and a pair of transversely spaced parallel frame members at the rear end thereof; a wheel and axle unit interconnecting the frame members; a first crossmember secured between the frame members forwardly of the wheel and axle unit and to which a front keel support assembly is mounted; a second crossmember mounted between the frame members rearwardly of the wheel and axle unit; and bunk and/or roller assemblies mounted on the rear and possibly front crossmember for supporting and guiding the underside of the hull of the boat.

The invention lies in the provision of at least a pair of load guide units, each of which is secured to an end of the rear crossmember and is also secured to an adjacent frame member, a portion of each load guide unit extended upwardly and outwardly of the frame such as to engage, guide and provide lateral support to a side of the boat hull during loading and transportation. The mounting of each load guide unit to the crossmember is such that the pressure received by the load guide unit from the boat is transmitted substantially in its entirety to the crossmember rather than to the frame member.

It is an object of this invention to provide an improved boat trailer.

It is another object of this invention to provide a new and novel load guide structure for a boat trailer.

Still another object of this invention is to provide a load guide structure capable of transmitting load forces to a trailer crossmember structure along its longitudinal axis, bypassing outer frame members.

Yet another object of this invention is to provide a load guide structure capable of eliminating load forces of a torsional nature on the frame of the trailer.

BRIEF DESCRIPTION OF THE DRAWINGS

These and other attributes of the invention will become more clear upon a thorough study of the following description of the preferred embodiment of the invention, particularly when reviewed in conjunction with the accompanying drawings wherein:

FIG. 5 is an exploded perspective view of the structure of FIG. 4, with an upper portion of the load guide of this invention added thereto;

FIG. 6 is a side elevational view of the elements of FIG. 5 in assembled form; and FIG. 7 is an elevational view similar to FIG. 4, but with the additional elements of FIG. 5 shown in assembled form.

BEST MODE FOR CARRYING OUT THE INVENTION

Figure 1:
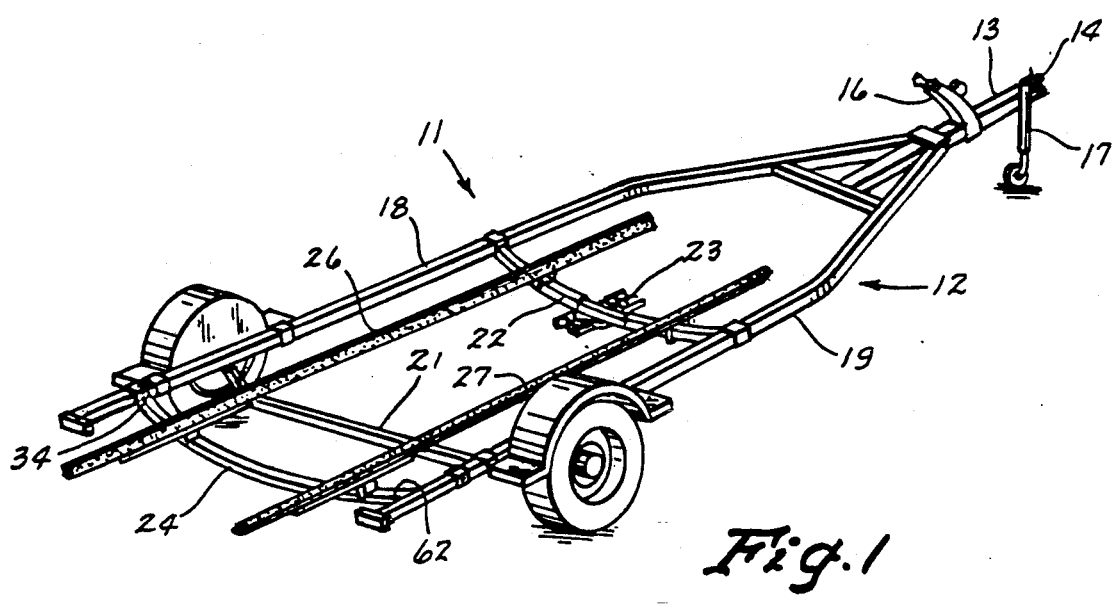
FIG. 1 is a perspective view of a boat trailer of the present invention.

Although not intended to be so limited, for convenience of illustration, the improved boat trailer of this invention is shown in connection with a trailer for loading and supporting a low or shallow draft-type boat. The illustrated trailer construction enables the boat to be loaded directly from the water by backing the trailer down a ramp or incline and bringing the rearmost hull engaging bunk assemblies of the trailer in a position close to the floating bunk. The boat is then advanced into contact with the bunk assemblies and drawn forward by operation of a winch and a supporting engagement with the bunk assemblies and with a forward keel supporting structure for full engagement and support of the boat for purposes of transportation.

Referring now to the drawings, particularly FIGS. 5-7, the load guide assembly is illustrated generally at (10) as used in conjunction with a boat trailer (11). The trailer (11) comprises a frame assembly (12) including a tongue section (13) and hitch (14) for conventional attachment to a prime mover (not shown); a winch assembly (16) mounted on the tongue section (13) for attachment to the bow of the prime mover; a jack stand assembly (17) mounted on the tongue section (13) for maintaining the trailer (11) in a substantially horizontal condition when not attached to the prime mover; the tongue section (13) diverging in a V-type arrangement to a pair of frame members (18) and (19) which are transversely spaced and parallel each other; a wheel and axle unit (21) secured to the rear of the frame members (18) and (19) for supporting the rear of the trailer (11); a front crossbar unit (22) mounted to and extended between the frame members (18) and (19) toward their front ends; a front keel supporting assembly (23) mounted on the front crossbar unit (22); a rear crossbar unit (24) extended between the frame members (18) and (19) rearwardly of the wheel and axle unit (21); and a pair of bunk units (26) and (27) each secured in transversely spaced, parallel relation to the front and rear crossbar assemblies (22) and (24).

Figure 4:
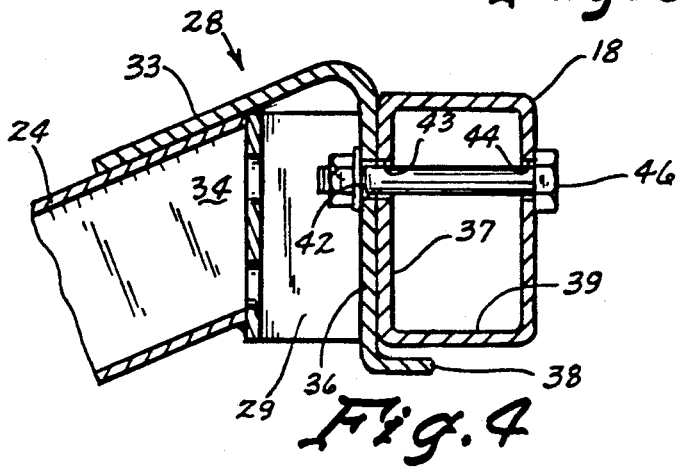
FIG. 4 is an enlarged sectional view as taken along the line 4—4 in FIG. 2.

More particularly, each load guide assembly (10) comprises a bracket (28) (FIG. 4) mounted on a U-shaped, welded end (29) of the rear crossbar unit (24) adjacent a frame member, (18) in this instance, an arm (30) (FIG. 7) secured to the bracket (28) and extended outwardly and upwardly from the crossbar unit (24), a fastener unit (31) (FIG. 7) securing the arm (30) to the bracket (28), and a cushion unit (32) mounted on the arm (30) at the outer end thereof for engagement with the hull (not shown) of a boat upon loading the boat on the trailer (11).

Figure 2:
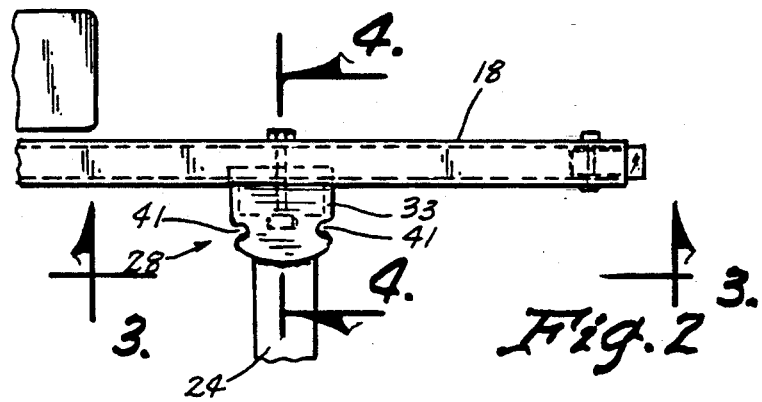
FIG. 2 is a fragmentary plan view of the rear end of one of the frame members of the boat trailer.
Figure 3:
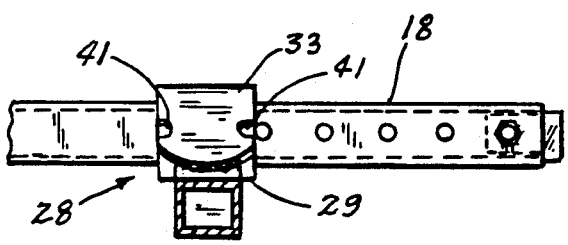
FIG. 3 is a view similar to FIG. 2, but showing a side elevational view thereof.

The bracket (28) (FIG. 4) has a Z-shape with a first leg (33) extended over and secured to the crossbar end (29), a second leg (36) disposed along an inner side (37) of the adjacent frame member (18), and a third leg (38) extended below and spaced downwardly from the base (39) of the adjacent frame member (18). For purposes more detailed hereinafter, a pair of openings or notches (41) (FIG. 2) are formed on opposite sides of the first leg (33).

The combined end (34) of the crossbar unit (24) and the bracket (28) are pivotally connected to the frame member (18), with pivotal rotation limited by the spacing between the frame member base (39) and the third leg (38) and by the width of the third leg (38), by the provision of an opening (42) (FIG. 4) formed in the second leg (36) alignable with transversely aligned openings (43) and (44) formed in the frame member (18), with a pivot bolt unit (46) inserted through the aligned openings (42), (43) and (44).

Referring to FIGS. 5 and 7, the arm (30) comprises a flat, straight lower portion (48) and a flat, straight upper portion (49) bent at an obtuse angle to the lower portion (48). The fastener unit (31) comprises a U-shaped element (51) having a base (52) adapted to overlie the bracket first leg (33), with parallel legs (53) inserted first through spaced holes (50) for ajustable mounting, and then through and within the notches (41), the legs (53) disposed downwardly on opposed sides of the crossbar (24) and inserted through openings (54) formed in a strap (56), the strap (56) disposed across the bottom of the crossbar (24). Fastening elements (57) (FIG. 7) secure the lower threaded ends of the legs (53) to the strap (56).

The cushion unit (32) (FIGS. 5-7) comprises a conventional bunk-type solid member (58) of wood or the like, covered by a resilient element (59) for a cushion effect upon engagement with the boat hull. Fasteners (61) secure the member (58) to the upper portion (49) of the arm (30). Other bunk-type arrangements may be used within the scope of this invention. Referring to FIG. 7, it may readily be seen that lateral forces from left to right against the cushion unit (32) are transmitted through the arm (30) to the bracket (28) and along the transversely extended longitudinal axis of the rear crossbar unit (24), bypassing the frame member (18) and obviating the application of torsional forces on the frame member (18) which could be in an arcuate direction within a vertical plane such as to tend to twist the frame member (18).

As mentioned hereinbefore, the other load guide assembly (10) would be secured to the opposite end (62) (FIG. 1) of the rear crossbar unit (24) and pivotally to the adjacent frame member (19). Thus both load guide assemblies (10) pivotally secure the rear crossbar unit (24) to the frame members (18), (19) while transmitting the load forces to the unit (24) along its longitudinal axis.

I claim:

1. In a boat trailer having a frame with a tongue section at a front end of the frame and a pair of transversely-spaced parallel frame members at a rear end of the frame, a wheel and axle unit interconnecting the frame members, and a crossmember extended between the frame members, the improvement comprising:

a bracket mounted on an end of the crossmember adjacent a frame member;

an arm secured at one end too said bracket and extended outwardly and upwardly from the said crossmember;

means securing said arm to said bracket; and cushion means mounted on said arm at another, free end of said arm for engagement with a hull of a boat upon loading the boat on the trailer;

and further wherein said bracket has a Z-shape with a first leg extended over and secured to the crossmember end, a second leg disposed along an inner side of the adjacent frame member, and a third leg extended below the adjacent frame member;

and further wherein said first leg has a pair of openings formed therein in spaced relationship.

2. The improvement of claim 1, and further wherein said second leg is pivotally mounted to the adjacent frame member, and said third leg is spaced downwardly from the adjacent frame member, whereby said bracket and the crossmember secured thereby are pivotally rotatable a limited amount about a normally horizontal, transversely extended pivot axis.

3. The improvement of claim 2, and further wherein said means securing said arm comprises a U-shaped member having a base and a pair of parallel legs, said base extended over said first leg, and said parallel legs disposed downwardly on opposed sides of the adjacent crossmember end, and means interconnecting said parallel legs at their lower ends.

4. The improvement of claim 3 and further wherein said parallel legs are disposed through said openings, respectively.

* * * * *